ated Mar. 30, 1971

3,573,009
RUST INHIBITED HYDROCARBON FUELS
Roland A. Bouffard, Union, N.J., assignor to Esso Research and Engineering Company
No Drawing. Continuation-in-part of application Ser. No. 547,731, May 5, 1966. This application June 3, 1968, Ser. No. 733,829
Int. Cl. C10l 1/22
U.S. Cl. 44—63          7 Claims

ABSTRACT OF THE DISCLOSURE

The rusting of ferrous surfaces brought about by the presence of traces of moisture in gasoline is prevented by adding to the gasoline a small proportion, within the range of about 1 to 100 pounds per thousand barrels of gasoline, of a gasoline-soluble heteroaromatic amine oxide, the latter being characterized as a cyclic nitrogen compound having at least one tertiary nitrogen atom in the ring, the ring having two conjugated double bonds when it is a 5-membered ring and three double bonds when it is a 6-membered ring.

DESCRIPTION OF THE INVENTION

This application is a continuation-in-part of application Ser. No. 547,731, filed May 5, 1966, now U.S. Pat. 3,387,953, issued June 11, 1968.

This invention concerns the use of certain additives for inhibiting the rusting characteristics of petroleum distillate products, particularly motor gasoline and aviation gasoline. Briefly, the invention involves the use of heteroaromatic nitrogen oxides, and certain derivatives thereof, as rust inhibitors in gasoline whereby the rusting of ferrous surfaces brought about by the presence of traces of moisture in the gasoline is prevented. These additives also serve as carburetor detergents when added to gasoline.

One problem that exists in the handling and use of petroleum products is the rusting which frequently occurs in equipment such as pipelines, storage tanks, engines, etc. In order to reduce and overcome this problem, many solutions have been suggested, including the development of effective rust inhibitors for petroleum products. The rusting problem which occurs when storing and using petroleum products is usually the result of traces of moisture which are inevitably present in petroleum distillates. Moisture finds its way into the distillates in a variety of ways, particularly during storage and handling. In this connection, for example, storage tanks are generally provided with breather devices to permit the intake and exhaust of air during atmospheric temperature changes. As a result, cool, moisture-laden air is generally drawn into a storage tank at night, resulting in the condensation of moisture in the tank. A portion of this moisture is dissolved in or entrained in petroleum products when pumped from the storage tanks.

It has now been found that heteroaromatic nitrogen oxides are very effective inhibitors against rusting and are also effective carburetor detergents when incorporated into gasoline compositions.

The nitrogen oxides that are used in this invention are more particularly characterized as N-oxides of heteroaromatic cyclic nitrogen compounds having at least one nitrogen atom in the ring and having at least two conjugated double bonds in the ring, said nitrogen atom being a tertiary nitrogen atom, that is having no hydrogen atoms attached thereto. The tertiary nitrogen atom is the atom to which the oxygen attaches in forming the amine oxide. It is believed that this occurs by bonding a single pair of electrons of the nitrogen atom to the oxygen atom by coordinative covalence.

Particularly useful are pyridine-1-oxide and the oxides of alkylated pyridines, including alpha, beta, and gamma picolines i.e. the N-oxides of 2-methyl, 3-methyl, and 4-methyl pyridine; and the N-oxides of other alkylated pyridines having a total of from 1 to 24 carbon atoms in alkyl groups, e.g., 2,3-lutidine, 2-dodecyl pyridine, 2-ethyl-4-isobutyl pyridine, etc.

Also particularly useful are the N-oxides of quinoline, isoquinoline, quinaldine and alkylated derivatives of these compounds, e.g. 2-hexyl quinoline.

Other heteroaromatic nitrogen oxides that can be used include the N-oxides of acridine, triazine, pyrazine, pyridazine, indolazine, pyrimidine, quinazoline, quinoxaline, purine, imidazole, cinnoline, naphthyridine, phthalazine, pyrazole, and alkyl and aryl derivatives thereof, e.g., 2,2'-dipyridyl-1-oxide, the N-oxide of 2-octyl quinoxaline, the N-oxide of 4-butyl pyridazine of 2-phenyl quinoxaline-4-oxide. Also included are derivatives of any of the N-oxides mentioned, in which there are present other functional groups, including ester, amide, or ether groups having sufficiently long hydrocarbon groups preferably having a total of 6 to 18 carbon atoms, to preserve solubility in gasoline. Nitro and amino derivatives are also included, wherein the nitro or amino groups can be present in the ring or on an aliphatic side chain, e.g. 4-nitro-3-hexyl pyridine-1-oxide; 2-(diethyl amino butyl) pyridine-1-oxide; 4-amino-2,5-diethyl pyridine-1-oxide; the N-oxide of 4-butoxy quinazoline; and the N-oxide of 2-dodecyloxy quinoline.

Specific examples of amide and ester derivatives include the N-oxide of the stearyl amide of nicotinic acid, the N-oxide of the oleyl amide of nicotinic acid, the dodecanoic ester of 8-hydroxyquinoline N-oxide, and the octyl alcohol (ethyl hexanol) ester of the N-oxide of nicotinic acid.

The preparation of amine oxides involves the oxidation of tertiary amine compounds with mild oxidizing agents such as hydrogen peroxide, perbenzoic acid, permonosulfuric acid, and the like. When hydrogen peroxide is used it is normally employed in the presence of glacial acetic acid or trifluoroacetic acid. In addition to perbenzoic acid, other per acids of carboxylic acids have also been used, including mono perphthalic acid, peracetic acid and permaleic acid. An informative description of the preparation of aromatic amine oxides will be found in Chapter 3 of Aromatic Amine Oxides by Eiji Ochiai, published by Elsevier Publishing Company, New York, 1967.

The N-oxide of an alkyl amide of nicotinic acid can be prepared in the following manner. Nicotinic acid is reacted with normal hexadecyl primary amine to form the corresponding amide as taught for example by Bagett et al., J. Amer. Chem. Soc. 67, 1135 (1945). The amide can then be converted to the corresponding N-oxide by oxidation with hydrogen peroxide in acetic acid as taught by Ochiai, supra. The N-oxides of the related alkyl amine amides of picolinic acid and of isonicotinic acid can be prepared in the same manner.

To prepare the N-oxide of an ester derivative, as for example the N-oxide of the hexadecyl ester of nicotinic acid, a convenient procedure is to start with the methyl ester of nicotinic acid, convert it to the hexadecyl ester by transesterification with hexadecanol in the presence of a basic catalyst, and then convert the higher ester to the N-oxide using hydrogen peroxide in acetic acid as the oxidizing agent.

Other N-oxides of the $C_8$ to $C_{18}$ alkyl amides and of the $C_8$ to $C_{18}$ alkyl esters of nicotinic acid that can be used in the present invention include the N-oxides of the hexyl amide, of the dodecyl ester, of the nonyl ester, of the ethyl hexyl amide, and of the $C_{13}$ Oxo alcohol ester.

The gasolines in which the additives of this invention are employed in order to prevent rust are conventional petroleum distillate fuels boiling in the gasoline range and intended for internal combustion engines, preferably spark ignition engines. Gasoline is defined as a mixture of liquid hydrocarbons having an initial boiling point in the range of about 70 to 135° F. and a final boiling point in the range of about 250 to 450° F. Gasolines are supplied in a number of different grades, depending upon the type of service for which they are intended. The additives of the invention may be employed in all of these grades but are particularly useful in motor and aviation gasolines. Motor gasolines include those defined by ASTM specification D–439–58T, Types A, B and C. They are composed of a mixture of various types of hydrocarbons, including aromatics, olefins, paraffins, isoparaffins, naphthenes, and, occasionally, diolefins. Suitable gasolines to which the additives of the instant invention may be added include those having an octane number range of 80 to 105 or higher, such as a clear octane number of over 90 and comprising at least 10% by volume of aromatic hydrocarbons and less than 30% by volume of olefinic hydrocarbons. These fuels are derived from petroleum crude oil by refining processes such as fractional distillation, catalytic cracking, hydroforming, alkylation, isomerization, polymerization and solvent extraction. Motor gasolines normally have boiling ranges between about 70° F. and about 450° F., while aviation gasolines have narrower boiling ranges of between 100° F. and 330° F. The vapor pressures of gasoline as determined by ASTM Method D–86 vary between about 7 and about 15 p.s.i. at 100° F. The amine oxides can also be employed in aviation gasolines, which have properties similar to those of motor gasolines but normally have somewhat higher octane numbers and narrower boiling ranges. The properties of aviation gasolines are set forth in U.S. Military specification MIL–F–5572 and ASTM specification D–910–57T.

The additives employed in accordance with this invention may be used in gasolines with other additive agents conventionally used in such fuels. It is common practice to employ from about 0.5 to about 7.0 cc./gal. of alkyl lead antiknock agents, such as tetraethyl lead, tretramethyl lead, dimethyl diethyl lead, or a similar alkyl lead antiknock agent or olefinic lead antiknock agent such as tetravinyl lead, triethyl vinyl lead, and the like, or a combination thereof, in motor gasolines and in aviation gasolines, e.g., 1.0 to 3.0 cc. of a tetraethyl-lead-tetramethyl-lead combination. The lead compounds are customarily employed in conjunction with a scavenging agent such as ethylene dichloride or ethylene dibromide. Antiknock agents that can be used also include other organometallic additives containing lead, iron, nickel, lithium, manganese and the like. Other additives such as those conventionally employed in gasolines may be used, such as corrosion inhibitors, antioxidants, antistatic agents, lead octane appreciators, e.g., t-butyl acetate, auxiliary scavengers like tri-β-chloroethyl phosphate, dyes, anti-icing agents, e.g. isopropanol, hexylene glycol, and the like.

It has recently been found advantageous to incorporate into gasolines, and particularly those used as motor fuels, certain oil-soluble dispersants and detergents to provide significant improvement in overall engine cleanliness. This is taught, for example, by Calvino et al., in U.S. Pat. 3,223,495. These dispersants function not only to maintain a high level of cleanliness in the fuel lines and carburetor region of the internal combustion engine, but also serve to bolster the action of dispersants that have been to the crankcase lubricant. A certain portion of the dispersant that has been added to the gasoline finds its way past the piston rings and helps to inhibit the deposition of varnish and sludge in the regions of the engine that are normally contacted only by the lubricant. The additives of the present invention may advantageously be used in gasoline compositions containing such dispersants.

The gasoline compositions embodying this invention will contain from about 1 to about 100 pounds of heterocyclic nitrogen oxide per thousand barrels of gasoline. (One barrel=42 U.S. gallons.) More usually from about 1 to 50 pounds per thousand barrels will be employed and preferably from about 2 to 15 pounds per thousand barrels, if the additive is to be used primarily for rust protection. If a dispersant is also employed in the gasoline, from about 5 to 100 pounds, of dispersant will ordinarily be used per thousand barrels of gasoline. It is frequently desirable also to incorporate a solvent oil into the gasoline in order to reduce intake valve deposits. If a solvent oil is used, it may be convenient to blend the dispersant and the solvent oil together and add the blend to the gasoline. A particularly preferred solvent oil will have a boiling range within the limits of about 350 to 800° F. at 10 mm. of mercury pressure. More preferably, the boiling range is about 400 to 700° F. at the reduced pressure. Solvent oils having a viscosity within the range of 45 to 150 SUS at 210° F. are usually preferred.

The nature of this invention and the advantages accruing from the practice thereof will be better understood when reference is made to the following examples, which include a preferred embodiment:

Example 1

A number of gasoline blends were prepared using as the base a gasoline that had the following inspections as shown in Table I:

TABLE I.—BASE GASOLINE INSPECTIONS

| | |
|---|---|
| ASTM Distillation, Method D–86; | |
| Initial boiling point, ° F. | 85 |
| 50% overhead, ° F. | 205 |
| Final boiling point, ° F. | 380 |
| ASTM gum, mg./100 ml. | 0.4 |
| ASTM breakdown time, min. | 960 |
| FIA analysis: | |
| Vol. percent saturates | 70.8 |
| Vol. percent olefins | 11.7 |
| Vol. percent aromatics | 17.5 |
| Tetraethyl lead, cc./gal. | 3.1 |

The blends were prepared by adding pyridine-1-oxide in various concentrations, by simple mixing, to separate portions of the base gasoline described above. The pyridine oxide was a purchased material.

The blends were subjected to a rust test which was a modification of ASTM Test D–665. In this test, 350 ml. of the gasoline to be tested is maintained at a temperature of 77° F. and is stirred with a polished soft steel spindle. After ten minutes of stirring for the purpose of conditioning the spindle, 50 ml. of the gasoline is removed and discarded, 30 ml. of distilled water is added, and stirring is continued for one hour, with the temperature being maintained at 77° F. The steel spindle is then removed from the mixture of gasoline and water and inspected for rust spots. Rusting that does not exceed 5 percent of the area is considered satisfactory. If the area that is rusted is too small to be measured and recorded as a percentage, the rust is expressed as the number of specks of rust observed. The tests were run in duplicate.

The blends were also subjected to a galvanic rust test wherein a 500 ml. portion of each blend is mixed with 0.5 volume percent of methanol and 0.5 vol. percent of sea water and the mixture is stirred for 30 minutes in contact with a steel-zinc couple. The test mixture is then stored in contact with the steel-zinc couple and without stirring, for 7 days at ambient temperatures. The area of rust on the steel panel (4" x 1") is then determined visually.

The synthetic sea water consists of an aqueous solution containing the following salts in the concentration noted, expressed as grams per liter: NaCl, 25.0;

$MgCl_2 \cdot 2H_2O$ 11.0; $CaCl_2$, 1.2; $Na_2SO_4$, 4.0.

The results obtained in the simple rust test and in the galvanic rust test are given in Table II, which follows:

TABLE II.—EFFECT OF PYRIDINE-1-OXIDE AS ANTI-RUST ADDITIVE

| Concentration of additive in gasoline | Percent area rusted | |
|---|---|---|
| | Modified ASTM test (duplicate runs) | Galvanic test |
| None [1] | 100; 100 | 100 |
| 0.1 p.t.b | 0; 100 | |
| 0.5 p.t.b | 50 | |
| 1 p.t.b | 0; 5 | 80 |
| 5 p.t.b | 0; 1 | 2 |
| 10 p.t.b | 0; 6 specks | 1 |

[1] P.t.b.=Pounds per thousand barrels (1 barrel=42 U.S. gallons).

It will be seen from the data in Table II that pyridine-1-oxide was very effective as a rust inhibitor in gasoline when used in concentrations of at least 1 pound per thousand barrels.

Example 2

Using as the base gasoline a gasoline as the same nature as Example 1, a blend was prepared by adding to the gasoline pyridine-1-oxide in a concentration of 6 pounds per thousand barrels of gasoline. This blend was subjected to a test that is designed to measure the detergency of a gasoline toward carburetor deposits. For this test, a 1964 Buick V-8 Special 300 cu. in., aluminum alloy engine is used. The engine has an 11/1 compression ratio and is equipped with a two-barrel carburetor. The barrels of the carburetor are fitted with aluminum sleeves which can be removed for weighing. Crankcase blowby gas is directed back to the carburetor to promote carburetor deposit formation. The test is conducted in a no-load stand. The test is run in two phases. In the first, or dirty-up phase, the engine is run with a gasoline without the detergency additive. The engine is idled at 650 r.p.m. for 4 minutes to form deposits and then run at 2000 r.p.m. for 35 seconds to allow the fuel to wash the deposit. This cycle is repeated for 20 hours. The sleeves and throttle plates are removed and weighed.

In the second, or clean-up phase, the dirty sleeves and throttle plates after weighing are placed back in the carburetor and the entire 20-hour procedure is repeated, using a gasoline containing the additive whose detergency is to be measured. The loss in weight of the sleeves and throttle plates is a measure of the detergency of the additive. The results are reported as percent reduction in deposits. In this test the blend containing pyridine-1-oxide gave a 40 wt. percent reduction in deposits.

Example 3

Part A—Preparation of cetyl nicotinamide.—A mixture of 12.3 g. (0.1 mole) of nicotinic acid and 24.6 g. (0.1 mole) of commercial grade hexadecyl amine was charged into a 3-necked 100 ml. flask fitted with a thermometer, a reflux condenser and a magnetic stirring bar. The stirred contents of the flask was heated for 30 minutes at 220° C., then cooled to 75° C. and washed with aqueous sodium carbonate solution until barely alkaline to litmus paper. The aqueous layer was withdrawn and the organic residue was washed twice with warm water. After the crude product was dried overnight in a vacuum desorber it was dissolved in 100 ml. of chloroform. The chloroform solution was washed twice with water, after which it was dried over anhydrous sodium sulfate and was then added to 400 ml. of heptane and the mixture was chilled. The white precipitate thus formed was collected by vacuum filtration and was precipitated once more from chloroform with four volumes of heptane to give 22.7 g. (65% yield) of product. The dried product melted at 78.5° C. and exhibited infrared bands (between NaCl plates) at 3330–3300 cm.$^{-1}$ (NH bands), 1630, 1570 and 1540 cm.$^{-1}$ (amide bands).

Part B—Preparation of cetyl nicotinamide N-oxide.— Five grams of the product prepared in Part A was dissolved in 30 ml. of glacial acetic acid. The mixture at room temperature was treated with 5 ml. of 30% aqueous hydrogen peroxide, then, 3 hours later, with a second aliquot of 3 ml. of hydrogen peroxide. Stirring of the reaction mixture was continued for 72 hours at room temperature. A small amount of platinum black was then added and stirring was continued for an additional 2 hours. The resulting product was filtered and the filtrate was combined with methanol washings from the filter (25 ml.). The combined filtrate and washings were evaporated at reduced pressure, and the evaporation residue was taken up in 50 ml. of chloroform and washed successively with 5% aqueous sodium bicarbonate until neutral and then with water. After drying over anhydrous sodium sulfate, the chloroform solution was evaporated under reduced pressure to yield 4 grams (80% yield) of product, M.P. 95° C. The infrared spectrum (between NaCl plates) resembled that of the product described in Part A and in addition contained a major new band at 1240 cm.$^{-1}$. Infrared bands at this position are reported to be characteristic of heteroaromatic N-oxides (Koji Nakanishi, Practical Infrared Absorption Spectroscopy, Holden-Day, Inc., San Francisco, Calif., 1962 p. 51).

Part C—Galvanic rust testing of cetyl nicotinamide and its N-oxide.—The products described in Parts A and B were blended at a concentration of 5 pounds per thousand barrels in a typical premium gasoline blend containing only lead antiknock additive and antioxidant additives and tested for anti-rust activity using the galvanic rust test procedure described in Example 1. The results are shown in Table III, which follows:

TABLE III

| | Percent area rusted |
|---|---|
| No additive | 100 |
| Part A amide | 35 |
| Part B N-oxide of amide | 15 |

Example 4

To a regular grade gasoline having an ASTM 50 percent distillation point of about 208° F. and containing about 2.8 cc. of lead tetraethyl per gallon, there are added as a dispersant 20 pounds per thousand barrels of a polyisobutenyl succinimide of tetraethylene pentamine (polyisobutenyl group of about 950 mol. wt.) (i.e., a dispersant of Type C of U.S. Pat. 3,233,495) ad as an anti-rust agent about 7 pounds per thousand barrels of the N-oxide of 3-propyl pyridine.

Example 5

A gasoline of 95 research octane number containing 2.5 cc. of lead tetraethyl per gallon and having 21 volume percent aromatic hydrocarbons, the gasoline having a 55% boiling point of 212° F. and a final boiling point of 395° F. (ASTM Method D–86), is improved with respect to anti-rust properties by adding thereto 2-decyl pyridine N-oxide at a concentration of about 9 pounds per thousand barrels.

Example 6

To the base gasoline described in Table I there is added the N-oxide of the ethyl hexyl ester of nicotinic acid in the amount of 12 pounds per thousand barrels to serve as a carburetor detergent and a rust inhibitor.

The scope of this invention is to be determined by the appended claims, and there is no intention to limit it to the specific embodiments herein presented in the examples.

What is claimed is:

1. A gasoline composition comprising a gasoline, to which has been added a rust preventing proportion of a gasoline-soluble heteroaromatic amine oxide, said heteroaromatic amine oxide being the N-oxide of a heteroaromatic nitrogen compound having a ring containing at least two conjugated double bonds, said ring being made up solely of carbon atoms and nitrogen atoms, at least one such nitrogen atom being a tertiary nitrogen atom to which oxygen is attached to form said amine oxide.

2. Composition as defined by claim 1 wherein said amine oxide is present in said composition in a concentration in the range of from about 1 to about 100 pounds per thousand barrels of gasoline.

3. Composition as defined by claim 1 wherein said amine oxide is pyridine-1-oxide.

4. Composition as defined by claim 1 wherein said oxide is an N-oxide of alkylated pyridine having a total of from 1 to 24 carbon atoms in alkyl groups.

5. Composition as defined by claim 1 wherein said amine oxide is an N-oxide of an aliphatic hydrocarbon amide of nicotinic acid.

6. Composition as defined by claim 1 wherein said amine oxide is an N-oxide of an aliphatic hydrocarbon ester of nicotinic acid.

7. Composition as defined by claim 1 wherein said amine oxide is cetyl nicotinamide N-oxide.

References Cited

UNITED STATES PATENTS

| | | | |
|---|---|---|---|
| 2,490,744 | 12/1949 | Trigg et al. | 252—51.5 |
| 2,699,427 | 1/1955 | Smith et al. | 252—33.6 |
| 3,277,003 | 10/1966 | Grayson | 252—392 |
| 3,007,784 | 11/1961 | Ebner | 44—72 |

DANIEL E. WYMAN, Primary Examiner

Y. H. SMITH, Assistant Examiner

U.S. Cl. X.R.

44—72